US009583786B2

(12) United States Patent
Lee et al.

(10) Patent No.: US 9,583,786 B2
(45) Date of Patent: Feb. 28, 2017

(54) SECONDARY BATTERY INCLUDING SOLID ELECTROLYTE LAYER (71) Applicant: LG CHEM, LTD., Seoul (KR)

(72) Inventors: Su Hee Lee, Daejeon (KR); Won Bae Byun, Daejeon (KR); Dong Hwan Kim, Daejeon (KR); Chee Sung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 91 days.

(21) Appl. No.: 14/415,402

(22) PCT Filed: Nov. 25, 2014

(86) PCT No.: PCT/KR2014/011382
§ 371 (c)(1),
(2) Date: Jan. 16, 2015

(87) PCT Pub. No.: WO2015/080450
PCT Pub. Date: Jun. 4, 2015

(65) Prior Publication Data
US 2016/0043430 A1 Feb. 11, 2016

(30) Foreign Application Priority Data
Nov. 26, 2013 (KR) .......................... 10-2013-0144586

(51) Int. Cl.
H01M 10/0562 (2010.01)
H01M 10/052 (2010.01)
(Continued)

(52) U.S. Cl.
CPC ......... H01M 10/0562 (2013.01); H01M 4/13 (2013.01); H01M 10/052 (2013.01);
(Continued)

(58) Field of Classification Search
CPC ........... H01M 10/0562; H01M 10/052; H01M 2300/0071
See application file for complete search history.

(56) References Cited

U.S. PATENT DOCUMENTS

2009/0068563 A1 3/2009 Kanda et al.
2009/0197178 A1 8/2009 Inda
(Continued)

FOREIGN PATENT DOCUMENTS

JP 2003346895 A 12/2003
JP 2009-206094 A 9/2009
(Continued)

OTHER PUBLICATIONS

Noh, S. et al: "Surface modification of LiCoO2 with Li3xLa2/3-xTiO3 for all-solid-state lithium ion batteries using Li2S-P2S5 glass-ceramic", Ceramics International, vol. 39, No. 7, Apr. 15, 2013, pp. 8453-8458, XP028676437.
(Continued)

Primary Examiner — Stewart Fraser
(74) Attorney, Agent, or Firm — Dentons US LLP (57) ABSTRACT Provided are a secondary battery including a positive electrode, a negative electrode, and a solid electrolyte layer disposed between the positive electrode and the negative electrode, wherein the positive electrode and the negative electrode include first solid electrolyte particles, the solid electrolyte layer includes second solid electrolyte particles, and a particle diameter of the second solid electrolyte particles is greater than a particle diameter of the first solid electrolyte particles.
In the secondary battery, the electrode may increase the amount of movement of lithium ions by increasing a contact area between the solid electrolyte particles and electrode active material, and the solid electrolyte layer may minimize the reduction of ionic conductivity by decreasing interfacial
(Continued)

resistance due to the contact between the electrode and the solid electrolyte layer. Thus, stability and performance of the secondary battery may be improved.

13 Claims, 1 Drawing Sheet

(51) Int. Cl.
    *H01M 4/13*     (2010.01)
    *H01M 4/02*     (2006.01)

(52) U.S. Cl.
    CPC ............ *H01M 2004/021* (2013.01); *H01M 2300/0071* (2013.01)

(56) References Cited

U.S. PATENT DOCUMENTS

| | | | | |
|---|---|---|---|---|
| 2010/0151335 | A1* | 6/2010 | Senga | H01B 1/122 429/322 |
| 2011/0045355 | A1* | 2/2011 | Ichikawa | H01M 4/043 429/231.95 |
| 2013/0017435 | A1* | 1/2013 | Sato | H01M 4/505 429/158 |
| 2013/0093130 | A1 | 4/2013 | Yada et al. | |
| 2014/0093786 | A1* | 4/2014 | Ito | H01M 4/62 429/322 |
| 2015/0044575 | A1* | 2/2015 | Kawaji | H01M 10/052 429/320 |
| 2015/0380765 | A1* | 12/2015 | Fujieda | H01M 10/052 429/304 |
| 2016/0020486 | A1* | 1/2016 | Lee | H01M 10/052 429/305 |

FOREIGN PATENT DOCUMENTS

| | | |
|---|---|---|
| JP | 2011-065982 A | 3/2011 |
| JP | 2012-243644 A | 12/2012 |
| KR | 10-2009-0027144 A | 3/2009 |
| WO | 2011/105574 A1 | 1/2011 |

OTHER PUBLICATIONS

Ban, C W et al: "The effect of sintering on the grain boundary conductivity of lithium lanthanum titanates", Solid State Ionics, North Holland Pub. Company. Amsterdam; NL, NL, vol. 140, No. 3-4, Apr. 1, 2001, pp. 285-292, XP004240074.

Sutorik, A C et al: "The comparative influences of structural ordering, grain size, Li-content, and bulk density on the Li-+-conductivity of Li0.29La0.57TiO3", Journal of Materials Science, Kluwer Academic Publishers, BO, vol. 47, No. 19, Jun. 26, 2012, pp. 6992-7002, XP035084766.

Stramare, S et al: "Lithium Lanthanum Titanates: A Review", Chemistry of Materials, American Chemical Society, US, vol. 15, No. 21, Oct. 21, 2003, pp. 3974-3990, XP001232588.

Yi, T-F et al: "High rate cycling performance of lanthanum-modified Li4Ti5O12 anode materials for lithium-ion batteries", Journal of Power Sources, Elsevier SA, CH, vol. 214, Apr. 26, 2012, pp. 220-226, XP028502016.

\* cited by examiner

SECONDARY BATTERY INCLUDING SOLID ELECTROLYTE LAYER

This application is a National Phase Application of International Application No. PCT/KR2014/011382, filed on Nov. 25, 2014 which claims the benefit of Korean Application Nos. 10-2013-0144586 filed on Nov. 26, 2013, all of which are hereby incorporated by reference in their entirety for all purposes as if fully set forth herein.

TECHNICAL FIELD

The present invention relates to a lithium secondary battery including an electrode and a solid electrolyte layer, and more particularly, to a secondary battery in which the electrode and the solid electrolyte layer respectively include solid electrolyte particles having different particle diameters.

BACKGROUND ART

The application field of chargeable and dischargeable secondary batteries is increasingly being expanded to electric vehicles as well as portable devices such as mobile phones, notebooks, and camcorders. Accordingly, secondary batteries have been actively developed. Also, research and development of battery design to improve capacity density and specific energy have been conducted during the development of the secondary batteries.

In general, it is known that battery safety improves in the order of a liquid electrolyte, a gel polymer electrolyte, and a solid polymer electrolyte, but battery performance decreases in the same order.

An electrolyte in a liquid state, particularly, an ion conductive organic liquid electrolyte, in which a salt is dissolved in a non-aqueous organic solvent, has been mainly used as an electrolyte for an electrochemical device, such as a typical battery using an electrochemical reaction and an electric double-layer capacitor. However, when the electrolyte in a liquid state is used, an electrode material may degrade and the organic solvent is likely to be volatilized. Also, there may be limitations in safety such as combustion due to a high ambient temperature and the temperature rise of the battery itself.

In particular, since an electrolyte used in a lithium secondary battery is in a liquid state and may have a risk of flammability in a high-temperature environment, this may impose a significant burden on electric vehicle applications. The above limitations may be addressed when the lithium electrolyte in a liquid state is replaced with a solid-state electrolyte. Thus, various solid electrolytes have been researched and developed to date.

A flame retardant material has been mainly used as a solid electrolyte and as a result, since the solid electrolyte is formed of a highly stable and non-volatile material, the solid electrolyte is stable at high temperature. Also, since the solid electrolyte may act as a separator, a typical separator is not required and a thin film process may be possible.

Among them, since a perovskite-structure oxide having a chemical formula of $Li_{0.33}La_{0.66}TiO_3$ (LLTO) is a material having high chemical stability and durability, a significant amount of research into this material has been conducted.

However, since a typical solid electrolyte may have high interfacial resistance, low ionic conductivity, and low flexibility due to the contact between an electrode and the solid electrolyte, there are various limitations in terms of processing.

DISCLOSURE OF THE INVENTION

Technical Problem

The present invention provides a secondary battery which may reduce interfacial resistance due to the contact between an electrode and a solid electrolyte layer and may minimize the reduction of ionic conductivity.

Technical Solution

According to an aspect of the present invention, there is provided a secondary battery including a positive electrode, a negative electrode, and a solid electrolyte layer disposed between the positive electrode and the negative electrode, wherein the positive electrode and the negative electrode include first solid electrolyte particles, the solid electrolyte layer includes second solid electrolyte particles, and a particle diameter of the second solid electrolyte particles is greater than a particle diameter of the first solid electrolyte particles.

Advantageous Effects

In a secondary battery according to an embodiment of the present invention, since an electrode and a solid electrolyte layer respectively include solid electrolyte particles having different particle diameters and second solid electrolyte particles included in the solid electrolyte layer and having a particle diameter greater than a particle diameter of first solid electrolyte particles included in the electrode are used, the electrode may increase the amount of movement of lithium ions by increasing a contact area between the solid electrolyte particles and electrode active material and the solid electrolyte layer may minimize the reduction of ionic conductivity by decreasing interfacial resistance due to the contact between the electrode and the solid electrolyte layer. Thus, stability and performance of the secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

Figure 1:
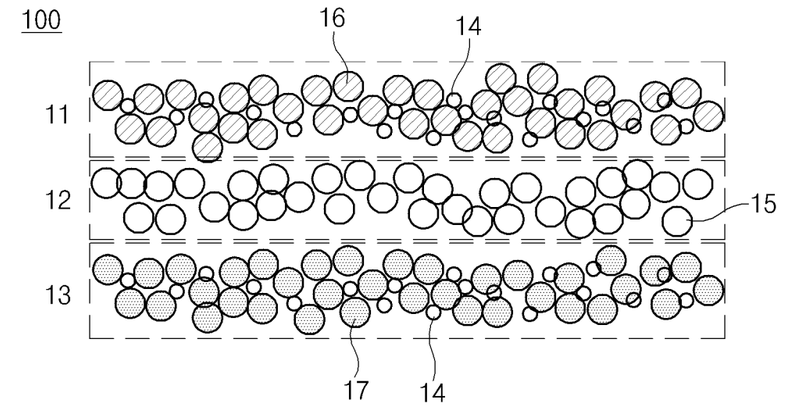
FIG. 1 is a schematic cross-sectional view schematically illustrating a cross-sectional structure of a secondary battery according to an embodiment of the present invention.

100: Secondary battery
11: Positive electrode
12: Solid electrolyte layer
13: Negative electrode
14: First solid electrolyte particle
15: Second solid electrolyte particle
16: active material for positive electrode
17: active material for negative electrode

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A secondary battery according to an embodiment of the present invention includes a positive electrode, a negative electrode, and a solid electrolyte layer disposed between the positive electrode and the negative electrode, wherein the positive electrode and the negative electrode include first solid electrolyte particles, the solid electrolyte layer includes second solid electrolyte particles, and a particle diameter of the second solid electrolyte particles is greater than a particle diameter of the first solid electrolyte particles.

In the secondary battery according to the embodiment of the present invention, the first solid electrolyte particles and the second solid electrolyte particles may each independently include a composite oxide (LLTO) represented by Chemical Formula 1 below:

$Li_{3x}La_{(2/3-x)}TiO_3 (0<x<0.16).<$        Chemical Formula 1>

The solid electrolyte particles represented by Chemical Formula 1 have a perovskite-structure and are oxide particles having high chemical stability and durability as well as excellent lithium ion conductivity.

In the secondary battery according to the embodiment of the present invention, the solid electrolyte particles represented by Chemical Formula 1 and having different particle diameters are respectively included in the positive electrode, the negative electrode, and the solid electrolyte layer, wherein the first solid electrolyte particles included in the positive electrode and the negative electrode may have a nano size and the second solid electrolyte particles included in the solid electrolyte layer may have a micrometer size.

Since the positive electrode and the negative electrode include the nanosized first solid electrolyte particles, a contact area between the solid electrolyte particles and an active material is increased and the amount of movement of lithium ions is increased. Thus, the performance of the secondary battery may be improved. Also, since the solid electrolyte layer includes the micro-sized second solid electrolyte particles, the number of grain boundaries may be reduced. Thus, the reduction of ionic conductivity due to the reduced grain boundaries may be minimized.

Furthermore, in the secondary battery according to the embodiment of the present invention, an average particle diameter ($D_{50}$) of the first solid electrolyte particles included in the positive electrode and the negative electrode is in a range of 1 nm to 100 nm, may be in a range of 20 nm to 100 nm, and more specifically, may be in a range of 20 nm to 50 nm.

In the case that the average particle diameter ($D_{50}$) of the first solid electrolyte particles is less than 1 nm, a process of preparing solid electrolyte particles having a diameter of less than the average particle diameter itself may be difficult. In the case in which the average particle diameter of the first solid electrolyte particles is greater than 100 nm, since an increase in the contact area between the electrode and the electrolyte due to the increase in specific surface area may not be sufficient, the movement of lithium ions at an interface may not be easy.

Also, in the secondary battery according to the embodiment of the present invention, an average particle diameter ($D_{50}$) of the second solid electrolyte particles included in the solid electrolyte layer is in a range of 1 μm to 10 μm, may be in a range of 2 μm to 10 μm, and more specifically, may be in a range of 2 μm to 7 μm.

In the case that the average particle diameter ($D_{50}$) of the second solid electrolyte particles is less than 1 μm, the ionic conductivity of the solid electrolyte particles may be reduced due to an increase in the number of grain boundaries. In the case in which the average particle diameter of the second solid electrolyte particles is greater than 10 μm, since the adhesion between the particles during the formation of a sintered body deteriorates due to the excessively large particle diameter of the solid electrolyte particles, pores may be formed. As a result, the ionic conductivity of the solid electrolyte particles may be reduced and the adhesion between the solid electrolyte layer and the electrode may be decreased. Thus, lifetime characteristics may be significantly decreased.

In the present invention, the average particle diameter ($D_{50}$), for example, may be measured by using a laser diffraction method or scanning electron microscope (SEM) image. The laser diffraction method may generally measure a particle diameter ranging from a submicron level to a few mm, and may obtain highly repeatable and high resolution results. The average particle diameter ($D_{50}$) of the solid electrolyte particles may be defined as a particle diameter at 50% in a cumulative particle diameter distribution.

Also, in the secondary battery according to the embodiment of the present invention, a specific surface area (BET) of the first solid electrolyte particles may be in a range of 100 $m^2/g$ to 400 $m^2/g$, and a specific surface area (BET) of the second solid electrolyte particles may be in a range of 10 $m^2/g$ to 50 $m^2/g$.

In the present invention, the specific surface area of the solid electrolyte particles may be measured by a Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

Also, in the secondary battery according to the embodiment of the present invention, with respect to the first solid electrolyte particles and the second solid electrolyte particles, a boundary may be formed in the composite oxide (LLTO) particle represented by Chemical Formula 1 to form a plurality of crystal grains in a single particle, and the crystal grain may include at least one LLTO crystal.

That is, the expression "crystal grain of the first solid electrolyte particles and the second solid electrolyte particles" denotes a microstructural unit constituting the single particle of LLTO in which at least one LLTO crystal is included. That is, each crystal grain may be defined by the boundaries formed on the surface or in the inside of the LLTO particle. The crystal grains and the boundaries in the LLTO particle, for example, may be observed by an SEM or X-ray diffraction (XRD).

In the present invention, in the case that a diameter of the crystal grains is measured by XRD, the first solid electrolyte particles and the second solid electrolyte particles are respectively put in a holder, and the diameter of the crystal grains may be obtained by analyzing diffraction patterns formed by irradiating the particles with X-rays.

Specifically, a diameter of the crystal grains of the first solid electrolyte particles may be in a range of 1 nm to 10 nm, and a diameter of the crystal grains of the second solid electrolyte particles may be in a range of 50 nm to 100 nm.

Also, in the secondary battery according to the embodiment of the present invention, the first solid electrolyte particles and the second solid electrolyte particles may respectively further include a composite oxide second phase, such as $Li_2TiO_3$ and $LaTiO_3$, as impurities in addition to a crystalline phase of the composite oxide (LLTO) represented by Chemical Formula 1.

The presence of the second phase included in the first solid electrolyte particles and the second solid electrolyte particles may be identified by XRD, and an amount of the second phase may be identified by calculating a ratio of the amount of the second phase excluding a $Li_{0.33}La_{0.557}TiO_3$ phase when a total amount of all crystalline phases observed by XRD is set as 100 wt %.

Specifically, the first solid electrolyte particles may include the second phase in an amount of 5 wt % or less, for example, 0.1 wt % to 5 wt %, based on a total weight of the first solid electrolyte particles. Also, the second solid electrolyte particles may include the second phase in an amount of 5 wt % or less, for example, 0.1 wt % to 5 wt %, based on a total weight of the second solid electrolyte particles. In the case that the amount of the second phase in the first and second solid electrolyte particles is greater than 5 wt %, the ionic conductivity of the electrolyte particles may be decreased, and as a result, capacity characteristics of the battery may degrade.

Also, in the secondary battery according to the embodiment of the present invention, the first solid electrolyte particles may have an ionic conductivity (S/cm) of $9.0 \times 10^{-4}$ S/cm to $4.0 \times 10^{-3}$ S/cm when measured at room temperature (25° C.), and the second solid electrolyte particles may have an ionic conductivity of $1.0 \times 10^{-3}$ S/cm to $5.0 \times 10^{-3}$ S/cm when measured at room temperature (25° C.)

For example, a method of measuring the ionic conductivity may be performed as follows. The first and second solid electrolyte particle powders are put in a stainless steel mold and pressed to prepare pellets, and the pellets may then be heat treated at about 1,250° C. for 12 hours using an electric furnace to fabricate sintered bodies. Each cell is completed by depositing gold (Au) on the top and the bottom of the sintered body using a hard mask at 100 W in an argon (Ar) atmosphere. Then, ionic conductivity at 25° C. may be measured from responses which are obtained by applying alternating current to each cell placed between two blocking electrodes using an impedance analyzer (IM6, Zahner).

The first solid electrolyte particles and the second solid electrolyte particles included in the secondary battery according to the embodiment of the present invention may be prepared using a method of preparing LLTO which is typically used in the art. For example, a solid-phase method or liquid-phase method using a lithium precursor, a lanthanum precursor, and a titanium precursor may be used, but the present invention is not limited thereto. However, the first solid electrolyte particles having a nano size according to the embodiment of the present invention may be specifically prepared by using a liquid-phase method to obtain nanosized particles.

Specifically, a method of preparing the first solid electrolyte particles using a liquid-phase method according to an embodiment of the present invention may include preparing a precursor solution by mixing a titanium precursor, a lanthanum precursor, and a lithium precursor in an aqueous or organic solvent (step (i)); and heat treating the precursor solution (step (ii)).

Titanium oxide powder including titanium oxide particles having an average particle diameter ($D_{50}$) of 0.5 nm to 10 nm may be used or a titanium oxide colloidal solution may be used as the titanium precursor usable according to an embodiment of the present invention.

The titanium oxide colloidal solution may be prepared by a method typically used in the art or a commercialized titanium oxide colloidal solution may be used, but the present invention is not limited thereto.

In the case that the titanium oxide colloidal solution is used, titanium alkoxide and a stabilizer, for example, are sequentially added to alcohol to be reacted. Then, distilled water and a basic solution are added to the reactant and mixed, and a titanium oxide colloidal solution may be obtained by the neutralization reaction of the resulting mixed solution.

According to an embodiment of the present invention, the titanium precursor may be used in an amount of 30 wt % to 50 wt % based on a total weight of the precursor solution.

Also, the lanthanum precursor usable according to an embodiment of the present invention may include any one selected from the group consisting of alkoxides, chlorides, oxides, hydroxides, oxyhydoxides, nitrates, carbonates, acetates, and oxalates which include lanthanum, or a mixture of two or more thereof. Among these materials, since lanthanum-containing nitrate, such as lanthanum nitrate $(La(NO_3)_3)$, is likely to generate second phase impurities, such as $LaTiO_3$, in the finally prepared electrolyte particles, the lanthanum precursor may specifically include any one selected from the group consisting of lanthanum carbonate $(La_2(CO_3)_3)$ and lanthanum oxide $(La_2O_3)$, or a mixture of two or more thereof.

The lanthanum precursor may be used in an amount of 40 wt % to 60 wt % based on a total weight of the precursor mixture.

Also, the lithium precursor usable according to an embodiment of the present invention may include any one selected from the group consisting of lithium chloride (LiCl), lithium carbonate $(Li_2CO_3)$, lithium hydroxide (LiOH), lithium phosphate $(Li_3PO_4)$, and lithium nitrate $(LiNO_3)$, or a mixture of two or more thereof.

The lithium precursor may be used in an amount of 5 wt % to 10 wt % based on the total weight of the precursor mixture.

The organic solvent may include ketones such as acetone or methylethylketone; ethers such as tetrahydrofuran; alcohols such as methanol, ethanol, propanol, isopropanol, or butanol; esters such as ethyl acetate; or halogenated hydrocarbons such as dichloromethane and chlorobenzene.

The mixing of the titanium precursor, lanthanum precursor, and lithium precursor in an aqueous or organic solvent may use mechanical milling to uniformly mix and prepare solid electrolyte particles having a uniform particle diameter distribution. The mechanical milling, for example, may be performed by using a roll mill, ball mill, or jet mill. The mixing may be performed for 1 hour to 8 hours, for example, 1 hour to 6 hours.

Also, in the step (ii) during the preparation of the first solid electrolyte particles according to the embodiment of the present invention, the heat treatment of the precursor solution, for example, may be performed by using an electric furnace in a temperature range of 700° C. to 1,000° C. and holding for about 1 minute to about 60 minutes, for example, 1 minute to 10 minutes.

The second solid electrolyte particles having a micro size according to the embodiment of the present invention may be obtained by using both solid-phase method and liquid-phase method that are typically used.

For example, with respect to the solid-phase method, the lithium precursor, lanthanum precursor, and titanium precursor powders, which have been described in the preparation of the first solid electrolyte particles, are mixed and heat treated in a temperature range of 900° C. to 1,400° C., and second solid electrolyte particles having a desired particle diameter may then be obtained by a grinding process. However, the present invention is not limited thereto. In this case, titanium oxide powder including titanium oxide particles having an average particle diameter ($D_{50}$) of 0.5 nm to 200 nm may be used as the titanium precursor.

Also, in the case that the liquid-phase method is used, the liquid-phase method which has been used in the preparation of the first solid electrolyte particles may be used, and in this case, second solid electrolyte particles having a micro size may be obtained by adjusting an average particle diameter of the titanium precursor. According to an embodiment of the present invention, the larger the average particle diameter of the titanium precursor is, the larger the particle diameter of the prepared solid electrolyte particles may be.

In the secondary battery according to the embodiment of the present invention, the solid electrolyte layer may be formed by a method typically used in the art. For example, the second solid electrolyte particles are mixed with a binder and an organic solvent to prepare the mixture in the form of a thick film by coating or screen printing the mixture on a substrate. Then, the substrate is removed to prepare a solid electrolyte layer.

In this case, the binder may be used in an amount so as to provide the adhesion between the second solid electrolyte particles and the adhesion between the solid electrolyte layer and the electrode, and specifically, the binder may be included in an amount of 0.1 parts by weight to 20 parts by weight, for example, 1 part by weight to 10 parts by weight, based on 100 parts by weight of the second solid electrolyte particles.

Also, a thickness of the solid electrolyte layer may be in a range of 10 μm to 20 μm.

Furthermore, in the secondary battery according to the embodiment of the present invention, the electrode may be prepared by a typical method known in the art using the first solid electrolyte particles. For example, a binder, a conductive agent, and a dispersant, if necessary, as well as a solvent are mixed with a mixture, which is obtained by mixing an electrode active material with the first solid electrolyte particles, and stirred to prepare a slurry, and a metal current collector is then coated with the slurry and pressed. Thereafter, the electrode may be prepared by drying the metal current collector. In this case, an active material for positive electrode or an active material for negative electrode may be used as the electrode active material.

A mixing weight ratio of the first solid electrolyte particles to the active material for positive electrode may be in a range of 1:1 to 1:5. Similarly, a mixing weight ratio of the first solid electrolyte particles to the active material for negative electrode may be in a range of 1:1 to 1:5.

An active material for positive electrode typically used in the art may be used as the above active material for positive electrode. The active material for positive electrode, for example, may include any one selected from the group consisting of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2(0 \leq y<1)$, $Li(Ni_aCo_bMn_c)O_4(0<a<2, 0<b<2, 0<c<2,$ and $a+b+c=2)$, $LiMn_{2-z}Ni_zO_4$, $LiMn_{2-z}Co_zO_4$ $(0<z<2)$, $LiCoPO_4$, and $LiFePO_4$, or a mixture of two or more thereof. However, the present invention is not limited thereto. Also, sulfide, selenide, and halide may be included in addition to the above oxides.

A carbon material, lithium metal, silicon, or tin, which may intercalate and deintercalate lithium ions, may be typically used as the active material for negative electrode. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode and/or positive electrode may be prepared by preparing a slurry by mixing and stirring the electrode active material, a binder, a solvent, and a conductive agent and a dispersant which may be typically used if necessary; coating a current collector with the slurry; and pressing the coated current collector.

Also, in the secondary battery according to the embodiment of the present invention, a shape of the lithium secondary battery is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

EMBODIMENT FOR CARRYING OUT THE INVENTION

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Preparation Example 1

Preparation of First Solid Electrolyte Particles 87.14 ml of an aqueous $TiO_2$ colloidal solution which includes $TiO_2$ having an average particle diameter of 2 nm to nm in a solid content concentration of about 50 mg/ml, 4.997 g of $La_2O_3$, and 0.665 g of $Li_2CO_3$ were added to 200 ml of ethanol. Then, in order to mix them as uniformly as possible, the above materials were mixed using a ball mill for 6 hours to prepare a precursor solution. The precursor solution was dried at 100° C. to entirely remove a liquid therefrom and then put in an alumina crucible to be introduced into an electric furnace. The temperature was increased to 850° C. at a heating rate of 50° C./min and was then held for 10 minutes while the temperature was maintained at 850° C. Thereafter, the temperature was quickly decreased to room temperature at a cooling rate of 50° C./min to obtain $Li_{0.33}La_{0.557}TiO_3$ as first solid electrolyte particles. In this case, an average particle diameter of the first solid electrolyte particles was 30 nm.

Preparation Example 2

Preparation of Second Solid Electrolyte Particles $Li_{0.33}La_{0.557}TiO_3$ as second solid electrolyte particles was obtained in the same manner as in Preparation Example 1 except that an aqueous $TiO_2$ colloidal solution which includes $TiO_2$ having an average particle diameter of 100 nm was used. In this case, an average particle diameter of the second solid electrolyte particles was 2 μm.

Preparation Example 3

Preparation of First Solid Electrolyte Particles $Li_{0.33}La_{0.557}TiO_3$ as first solid electrolyte particles was obtained in the same manner as in Preparation Example 1 except that an aqueous $TiO_2$ colloidal solution which includes $TiO_2$ having an average particle diameter of 20 nm was used. In this case, an average particle diameter of the first solid electrolyte particles was 100 nm.

Preparation Example 4

Preparation of First Solid Electrolyte Particles $Li_{0.33}La_{0.557}TiO_3$ as first solid electrolyte particles was obtained in the same manner as in Preparation Example 1 except that an aqueous $TiO_2$ colloidal solution which includes $TiO_2$ having an average particle diameter of 50 nm was used. In this case, an average particle diameter of the first solid electrolyte particles was 0.5 μm.

Preparation Example 5

Preparation of Second Solid Electrolyte Particles $Li_{0.33}La_{0.557}TiO_3$ as second solid electrolyte particles was obtained in the same manner as in Preparation Example 1 except that an aqueous $TiO_2$ colloidal solution which includes $TiO_2$ having an average particle diameter of 5 μm was used. In this case, an average particle diameter of the second solid electrolyte particles was 12 μm.

Preparation Example 6

Preparation of First Solid Electrolyte Particles $Li_{0.33}La_{0.557}TiO_3$ as first solid electrolyte particles was obtained in the same manner as in Preparation Example 1 except that $La(NO_3)_3$ was used instead of $La_2O_3$. In this case, an average particle diameter of the first solid electrolyte particles was 30 nm, but some $LaTiO_3$ was formed as a second phase.

Preparation Example 7

Preparation of First Solid Electrolyte Particles $Li_{0.33}La_{0.557}TiO_3$ as first solid electrolyte particles was obtained in the same manner as in Preparation Example 3 except that $La(NO_3)_3$ was used instead of $La_2O_3$. In this case, an average particle diameter of the first solid electrolyte particles was 100 nm, but some $LaTiO_3$ was formed as a second phase.

Example 1

Preparation of Lithium Secondary Battery

<Preparation of Positive Electrode>

A mixture was used in which the first solid electrolyte particles of $Li_{0.33}La_{0.557}TiO_3$ having an average particle diameter of 30 nm, which were prepared in Preparation Example 1, and $LiMn_{0.33}Ni_{0.33}CO_{0.33}O_2$ as an active material for positive electrode were uniformly mixed at a weight ratio of 1:3.

A slurry for positive electrode was prepared by mixing the above mixture, acetylene black as a conductive agent, and polyvinylidene fluoride as a binder at a weight ratio of 85:5:10 and mixing this mixture with N-methyl-2-pyrrolidone as a solvent.

An about 20 μm thick aluminum (Al) thin film as a collector for positive electrode was coated with the prepared slurry for positive electrode and dried, and the Al thin film was then roll-pressed to prepare a positive electrode.

<Preparation of Negative Electrode>

A mixture was used in which the first solid electrolyte particles of $Li_{0.33}La_{0.557}TiO_3$ having an average particle diameter of 30 nm, which were prepared in Preparation Example 1, and spherical natural graphite as an active material for negative electrode were uniformly mixed at a weight ratio of 1:3.

A slurry for negative electrode was prepared by mixing the above mixture, super-p as a conductive agent, and styrene-butadiene rubber (SBR) and carboxymethyl cellulose (CMC) as a binder at a weight ratio of 95.5:1.5:1.5:1.5, and adding this mixture to N-methyl-2-pyrrolidone (NMP) as a solvent. One surface of a copper foil was coated with the slurry and dried, and the coated copper foil was then roll-pressed to prepare a negative electrode.

<Preparation of Lithium Secondary Battery>

The second solid electrolyte particles of $Li_{0.33}La_{0.557}TiO_3$ having an average particle diameter of 2 μm which were prepared in Preparation Example 2, a binder solution in which ethyl cellulose was dissolved in butyl carbitol, and terpineol were mixed, and the mixture was then screen printed on the prepared positive electrode to obtain a solid electrolyte layer having a final dried thickness of 10 μm. After the solid electrolyte layer was sufficiently dried at 220° C., the preparation of a lithium secondary battery was completed by laminating the negative electrode on the solid electrolyte layer. In this case, the second solid electrolyte particles and the ethyl cellulose were mixed at a weight ratio of 94:6.

Example 2

Preparation of Lithium Secondary Battery

A lithium secondary battery was prepared in the same manner as in Example 1 except that the first solid electrolyte particles of $Li_{0.33}La_{0.557}TiO_3$ having an average particle diameter of 100 nm, which were prepared in Preparation Example 3, were used in the preparation of the positive electrode and the negative electrode.

Example 3

Preparation of Lithium Secondary Battery

A lithium secondary battery was prepared in the same manner as in Example 1 except that the first solid electrolyte particles of $Li_{0.33}La_{0.557}TiO_3$ having an average particle diameter of 0.5 μm, which were prepared in Preparation Example 4, were used in the preparation of the positive electrode and the negative electrode.

Comparative Example 1

Preparation of Lithium Secondary Battery

A lithium secondary battery was prepared in the same manner as in Example 1 except that the first solid electrolyte particles of $Li_{0.33}La_{0.557}TiO_3$ prepared in Preparation Example 1 were not used in the preparation of the positive electrode and the negative electrode, and an active material, a conductive agent, and a binder were only used.

Comparative Example 2

Preparation of Lithium Secondary Battery

A lithium secondary battery was prepared in the same manner as in Example 1 except that the first solid electrolyte particles of $Li_{0.33}La_{0.557}TiO_3$ having an average particle diameter of 30 nm, which were prepared in Preparation Example 1, were used in the preparation of the solid electrolyte layer.

Experimental Example 1

Specific Surface Area (BET) Measurement

Specific surface areas of the first solid electrolyte particles and the second solid electrolyte particles respectively prepared in Preparation Examples 1 and 2 may be measured by a Brunauer-Emmett-Teller (BET) method. That is, the specific surface areas were measured by a 6-point BET method according to a nitrogen gas adsorption-flow method using a porosimetry analyzer (Belsorp-II mini by Bell Japan Inc.).

The results thereof are presented in Table 1.

TABLE 1

| Examples | Average particle diameter ($D_{50}$) of $Li_{0.03}La_{0.557}TiO_3$ | Specific surface area (BET) (m$^2$/g) |
|---|---|---|
| Preparation Example 1 | 30 nm | 129 |
| Preparation Example 2 | 2 μm | 16 |

Experimental Example 2

Measurement of Ratio of Second Phase

It was investigated whether other second phases, such as $Li_2TiO_3$ and $LaTiO_3$, were formed in addition to a $Li_{0.33}La_{0.557}TiO_3$ crystalline phase in the first and second solid electrolyte particles prepared in Preparation Examples 1 to 7.

Specifically, the first and second solid electrolyte particles prepared in Preparation Examples 1 to 7 were analyzed by using X-ray diffractometer (XRD) and a ratio of the amount of the second phase excluding the $Li_{0.33}La_{0.557}TiO_3$ phase was calculated when a total amount of all crystalline phases observed by XRD was set as 100 wt %. The results thereof are presented in Table 2 below.

Experimental Example 3

Ionic Conductivity Measurement

The first and second solid electrolyte particle powders prepared in Preparation Examples 1 to 7 were respectively put in a stainless steel mold and pressed to prepare pellets, and the pellets were then heat treated at about 1,250° C. for 12 hours using an electric furnace to fabricate sintered bodies. A diameter of the fabricated sintered bodies was 16 mm, and each cell was completed by depositing gold (Au) on the top and the bottom of the sintered body to a thickness of 100 nm using a hard mask at 100 W in an argon (Ar) atmosphere. Ionic conductivity at 25° C. was measured from responses which were obtained by applying alternating current to each cell placed between two blocking electrodes using an impedance analyzer (IM6, Zahner). The results thereof are presented in Table 2.

TABLE 2

| Examples | Average particle diameter ($D_{50}$) of solid electrolyte | Ratio of second phase in solid electrolyte (wt %) | Ionic conductivity (S/cm) |
|---|---|---|---|
| Preparation Example 1 | 30 nm | 5 | $0.98 \times 10^{-3}$ |
| Preparation Example 2 | 2 μm | 2 | $3.5 \times 10^{-3}$ |
| Preparation Example 3 | 100 nm | 5 | $2.3 \times 10^{-3}$ |
| Preparation Example 4 | 0.5 μm | 4 | $1.5 \times 10^{-3}$ |
| Preparation Example 5 | 12 μm | 3 | $2.2 \times 10^{-5}$ |
| Preparation Example 6 | 30 nm | 13 | $8.2 \times 10^{-5}$ |
| Preparation Example 7 | 100 nm | 12 | $7.1 \times 10^{-5}$ |

As illustrated in Table 2, as a result of measuring the ionic conductivities of the first and second solid electrolyte particles prepared in Preparation Examples 1 to 7, with respect to Preparation Examples 1 to 3 including the same amount of the second phase in the solid electrolyte particles, the ionic conductivity of Preparation Example 1 was $0.98 \times 10^{-3}$ S/cm and the ionic conductivity of Preparation Example 3 was $2.3 \times 10^{-3}$ S/cm. Thus, Preparation Example 3 exhibited higher ionic conductivity than Preparation Example 1. This indicated that the ionic conductivity was increased as the average particle diameter of the solid electrolyte particles was increased.

Also, when respectively comparing the solid electrolyte particles of Preparation Examples 1 and 6 and the solid electrolyte particles of Preparation Examples 3 and 7 having the same average particle diameter, the ionic conductivity of Preparation Example 6 was $8.2 \times 10^{-5}$ S/cm, and thus, Preparation Example 6 exhibited significantly decreased ionic conductivity in comparison to Preparation Example 1. Also, with respect to Preparation Example 7, the ionic conductivity was $7.1 \times 10^{-5}$ S/cm, and thus, Preparation Example exhibited significantly decreased ionic conductivity in comparison to Preparation Example 3. This indicated that the ionic conductivity was decreased as the amount of the second phase in the solid electrolyte particles was increased.

Furthermore, when comparing the solid electrolyte particles of Preparation Example 1, 2, and 4, the average particle diameter was increased and the amount of the second phase was gradually decreased in the order of Preparation Examples 1, 4, and 2, and as a result, the ionic conductivity was increased in the order of Preparation Examples 1, 4, and 2.

When comparing Preparation Example 4 and 5, even though the solid electrolyte particles of Preparation Example 5 had a larger average particle diameter and a lower ratio of the second phase in the solid electrolyte than the solid electrolyte particles of Preparation Example 4, the solid electrolyte particles of Preparation Example 5 exhibited significantly low ionic conductivity of about $10^{-5}$ S/cm. The reason for this may be explained as follows. The ionic conductivity increased as the average particle diameter of the solid electrolyte particles constituting the solid electrolyte layer was increased. However, in the case that the average particle diameter was excessively large (i.e., greater than 10 μm), since an excessive number of pores between the solid electrolyte particles were formed during the formation of the sintered body, the ionic conductivity rather decreased.

Experimental Example 4

Battery Capacity Evaluation

Capacity evaluation tests were performed on the solid secondary battery unit cells prepared in the examples and comparative examples using a charge and discharge evaluation apparatus. The unit cells were charged at a constant current density of 0.05 mA/cm² and then discharged to measure final discharge capacities. An upper limit charge voltage of 4.0 V was maintained, and a lower limit discharge voltage of 2.5 V was maintained. The resulting discharge capacity of each sample is presented in Table 3 below.

TABLE 3

| Examples | Average particle diameter ($D_{50}$) of first solid electrolyte particles (active material layers for positive electrode and negative electrode) | Average particle diameter ($D_{50}$) of second solid electrolyte particles (solid electrolyte layer) | Discharge capacity (mAh/g) |
|---|---|---|---|
| Example 1 | 30 nm | 2 μm | 103 |
| Example 2 | 100 nm | 2 μm | 102 |
| Example 3 | 0.5 μm | 2 μm | 94 |
| Comparative Example 1 | — | 2 μm | 92 |
| Comparative Example 2 | 30 nm | 30 nm | 91 |

As illustrated in Table 3, Examples 1 to 3, in which the average particle diameter of the second solid electrolyte particles included in the solid electrolyte layer was greater than the average particle diameter of the first solid electrolyte particles included in the active material layers for positive electrode and negative electrode, exhibited excellent discharge capacities in comparison to Comparative Example 1, in which the solid electrolyte particles were not included in the active material layers for positive electrode and negative electrode, but were only included in the solid electrolyte layer.

Also, Examples 1 to 3 exhibited excellent discharge capacities in comparison to Comparative Example 2 in which the average particle diameters of the solid electrolyte particles included in the active material layers for positive electrode and negative electrode and the solid electrolyte layer were the same. The reason for this is that, with respect to Comparative Example 2, the ionic conductivity in the solid electrolyte layer was low.

Furthermore, among Examples 1 to 3, Examples 1 and 2, in which the average particle diameter of the first solid electrolyte particles included in the active material layers for positive electrode and negative electrode was in a range of 1 nm to 100 nm, exhibited excellent discharge capacities in comparison to Example 3.

INDUSTRIAL APPLICABILITY

In a lithium secondary battery according to an embodiment of the present invention, since an electrode and a solid electrolyte layer respectively include solid electrolyte particles having different particle diameters and second solid electrolyte particles included in the solid electrolyte layer and having a particle diameter greater than a particle diameter of first solid electrolyte particles included in the electrode are used, the electrode may increase the amount of movement of lithium ions by increasing a contact area between the solid electrolyte particles and electrode active material and the solid electrolyte layer may minimize the reduction of ionic conductivity by decreasing interfacial resistance due to the contact between the electrode and the solid electrolyte layer. Thus, stability and performance of the secondary battery may be improved.

Accordingly, the secondary battery may not only be used in a battery cell that is used as a power source of a small device, but may also be used as a unit cell in a medium and large sized battery module including a plurality of battery cells.

The invention claimed is:

1. A secondary battery comprising:
a positive electrode,
a negative electrode, and
a solid electrolyte layer disposed between the positive electrode and the negative electrode,
wherein the positive electrode and the negative electrode comprise first solid electrolyte particles,
the solid electrolyte layer comprises second solid electrolyte particles, and
a particle diameter of the second solid electrolyte particles is greater than a particle diameter of the first solid electrolyte particles.

2. The secondary battery of claim 1, wherein the first solid electrolyte particles and the second solid electrolyte particles comprise a composite oxide represented by Chemical Formula 1:

$Li_{3x}La_{(2/3-x)}TiO_3$ (0<x<0.16).     <Chemical Formula 1>

3. The secondary battery of claim 1, wherein the first solid electrolyte particles are nanosized particles and the second solid electrolyte particles are micron-sized particles.

4. The secondary battery of claim 3, wherein an average particle diameter of the first solid electrolyte particles is in a range of 1 nm to 100 nm.

5. The secondary battery of claim 3, wherein an average particle diameter of the second solid electrolyte particles is in a range of 1 μm to 10 μm.

6. The secondary battery of claim 1, wherein a specific surface area (Brunauer-Emmett-Teller (BET)) of the first solid electrolyte particles is in a range of 100 m²/g to 400 m²/g, and a specific surface area (BET) of the second solid electrolyte particles is in a range of 10 m²/g to 50 m²/g.

7. The secondary battery of claim 1, wherein the first solid electrolyte particles are included in an active layer for the positive electrode by being mixed with an active material for the positive electrode.

8. The secondary battery of claim 7, wherein a mixing weight ratio of the first solid electrolyte particles to the active material for the positive electrode is in a range of 1:1 to 1:5.

9. The secondary battery of claim 1, wherein the first solid electrolyte particles are included in an active layer for the negative electrode by being mixed with an active material for the negative electrode.

10. The secondary battery of claim 9, wherein a mixing weight ratio of the first solid electrolyte particles to the active material for the negative electrode is in a range of 1:1 to 1:5.

11. The secondary battery of claim 1, wherein a thickness of the solid electrolyte layer is in a range of 10 μm to 20 μm.

12. The secondary battery of claim 1, wherein the first solid electrolyte particles are obtained by using a liquid-phase method using a lithium precursor, a lanthanum precursor, and a titanium precursor.

13. The secondary battery of claim 1, wherein the first solid electrolyte particles have an ionic conductivity of $9.0 \times 10^{-4}$ S/cm to $4.0 \times 10^{-3}$ S/cm at room temperature, and the second solid electrolyte particles have an ionic conductivity of $1.0 \times 10^{-3}$ S/cm to $5.0 \times 10^{-3}$ S/cm at room temperature.

\* \* \* \* \*